US010574880B2

(12) United States Patent
Wang et al.

(10) Patent No.: US 10,574,880 B2
(45) Date of Patent: Feb. 25, 2020

(54) PHOTOGRAPHING METHOD AND MOBILE TERMINAL

(71) Applicant: Huawei Device Co.,Ltd., Shenzhen, Guangdong (CN)

(72) Inventors: Xiuwen Wang, Shenzhen (CN); Xiaobo Yu, Shanghai (CN); Yuanqiang Ni, Shanghai (CN); Wei Su, Shanghai (CN); Junbo Ye, Bellevue, WA (US)

(73) Assignee: Huawei Device Co., Ltd., Dongguan (CN)

( * ) Notice: Subject to any disclaimer, the term of this patent is extended or adjusted under 35 U.S.C. 154(b) by 0 days.

(21) Appl. No.: 15/893,669

(22) Filed: Feb. 11, 2018

(65) Prior Publication Data

US 2018/0167554 A1    Jun. 14, 2018

Related U.S. Application Data

(63) Continuation of application No. 15/108,721, filed as application No. PCT/CN2014/072630 on Feb. 27, 2014, now Pat. No. 9,930,251.

(51) Int. Cl.
*H04N 5/232* (2006.01)
*G06F 3/01* (2006.01)

(52) U.S. Cl.
CPC ......... *H04N 5/23222* (2013.01); *G06F 3/017* (2013.01); *H04N 5/232* (2013.01); *H04N 5/23216* (2013.01)

(58) Field of Classification Search
CPC .......... H04N 5/23222; H04N 5/23216; H04N 5/232; G06F 3/017
See application file for complete search history.

(56) References Cited

U.S. PATENT DOCUMENTS

| | | | |
|---|---|---|---|
| 2002/0180622 | A1 | 12/2002 | Lui et al. |
| 2008/0132199 | A1* | 6/2008 | Hirata .................. G08B 25/016 455/404.2 |
| 2008/0303681 | A1 | 12/2008 | Herz et al. |
| 2009/0247245 | A1 | 10/2009 | Strawn et al. |
| 2010/0033422 | A1 | 2/2010 | Mucignat et al. |

(Continued)

FOREIGN PATENT DOCUMENTS

| | | |
|---|---|---|
| CN | 201491132 U | 5/2010 |
| CN | 103002152 A | 3/2013 |

(Continued)

*Primary Examiner* — Gevell V Selby
(74) *Attorney, Agent, or Firm* — Huawei Technologies Co., Ltd.

(57) ABSTRACT

Embodiments of the present invention disclose a photographing method. The method includes: detecting a first operation performed on the mobile terminal; determining whether the first operation meets a first preset condition; supplying electrical power to hardware components of the mobile terminal that are involved in performing the photographing operation when the first operation meets the first preset condition, and pre-allocating an application resource for the photographing operation; detecting a second operation performed on the mobile terminal; determining whether the second operation meets a second preset condition; and performing the photographing operation when the second operation meets the second preset condition.

20 Claims, 7 Drawing Sheets

(56) References Cited

U.S. PATENT DOCUMENTS

| | | |
|---|---|---|
| 2010/0149370 A1 | 6/2010 | Kim |
| 2010/0151903 A1* | 6/2010 | Yamamoto ............. H04N 5/235 |
| | | 348/229.1 |
| 2011/0058052 A1 | 3/2011 | Bolton et al. |
| 2011/0267524 A1 | 11/2011 | Lee et al. |
| 2012/0019704 A1* | 1/2012 | Levey ................ H04N 5/23241 |
| | | 348/335 |
| 2012/0026348 A1 | 2/2012 | Yun et al. |
| 2012/0233571 A1 | 9/2012 | Wever et al. |
| 2013/0102273 A1 | 4/2013 | Jung et al. |
| 2016/0212387 A1* | 7/2016 | Zhu ........................ H04N 5/225 |
| 2016/0337581 A1* | 11/2016 | Wang ..................... H04N 5/232 |

FOREIGN PATENT DOCUMENTS

| | | |
|---|---|---|
| CN | 103019542 A | 4/2013 |
| CN | 103024178 A | 4/2013 |
| CN | 103116412 A | 5/2013 |
| CN | 103294201 A | 9/2013 |
| CN | 103533161 A | 1/2014 |
| EP | 2498168 A2 | 9/2012 |
| WO | 2012079377 A1 | 6/2012 |

\* cited by examiner

PHOTOGRAPHING METHOD AND MOBILE TERMINAL

CROSS-REFERENCE TO RELATED APPLICATIONS

This application is a continuation of U.S. patent application Ser. No. 15/108,721, filed on Jun. 28, 2016, which is a national stage of International Application No. PCT/CN2014/072630, filed on Feb. 27, 2014. Both of the aforementioned applications are hereby incorporated by reference in their entireties.

TECHNICAL FIELD

The present invention relates to the field of communications technologies, and in particular, to a photographing method and a mobile terminal.

BACKGROUND

Along with the popularity of smart mobile terminals, such as mobile phones and tablets, and rapid development of the mobile Internet, the number of smart mobile terminals used by users is increasing. A photographing function has become one of standard configurations of a smart mobile terminal. People use mobile terminals instead of professional cameras to take photos in most occasions of daily life because existing mobile terminals have an increasingly powerful photographing capability and are easy to carry. People's requirements for recording beautiful moments always exist, and are even becoming stronger. However, in the prior art, it takes some time for a camera application in a mobile terminal to start up. It frequently happens that when a person takes out a mobile terminal, scenery of which the person wants to capture a photo no longer exists after the mobile terminal powers on hardware used for photographing, enables a sensor and an image signal processor, and starts a camera application to take a photo. Therefore, the beautiful moments that a person wants to record are easy to be missed.

SUMMARY

Embodiments of the present invention provide a photographing method and a mobile terminal, so as to solve a problem of slow camera startup for photo capturing and low photo capturing efficiency.

A first aspect of the embodiments of the present invention provides a photographing method, where the method may include:

receiving a first instruction generated when a user executes a first operation on a mobile terminal;

determining, according to the first instruction, whether the first operation matches a first preset operation;

if the first operation matches the first preset operation, powering on hardware used for photographing, and preloading a camera application resource;

receiving a second instruction generated when a user executes a second operation on the mobile terminal;

determining, according to the second instruction, whether the second operation matches a second preset operation; and if the second operation matches the second preset operation, executing a photographing action.

In a first possible implementation manner of the first aspect, the determining, according to the first instruction, whether the first operation matches a first preset operation includes:

detecting an acceleration at which the mobile terminal moves when the user executes the first operation;

determining whether the acceleration reaches a preset threshold; and if the acceleration reaches the preset threshold, determining that the first operation matches the first preset operation; and the determining, according to the second instruction, whether the second operation matches a second preset operation includes:

determining whether the acceleration changes to zero after the user executes the first operation; and if the acceleration changes to zero, determining that the second operation matches the second preset operation.

In a second possible implementation manner of the first aspect, the determining, according to the first instruction, whether the first operation matches a first preset operation includes:

determining whether the first instruction is generated when the user presses a preset button on the mobile terminal for a first time; and if the first instruction is generated when the user presses the preset button on the mobile terminal for the first time, determining that the first operation matches the first preset operation; and the determining, according to the second instruction, whether the second operation matches a second preset operation includes:

determining whether the second instruction is generated when the user presses the preset button for a second time, and a time difference between receipt of the second instruction and receipt of the first instruction is within a preset time difference; and if the second instruction is generated when the user presses the preset button for the second time, and the time difference between the receipt of the second instruction and the receipt of the first instruction is within the preset time difference, determining that the second operation matches the second preset operation.

In a third possible implementation manner of the first aspect, the determining, according to the first instruction, whether the first operation matches a first preset operation includes:

determining whether the first instruction is generated when the user presses and holds a preset button on the mobile terminal; and if the first instruction is generated when the user presses and holds the preset button on the mobile terminal, determining that the first operation matches the first preset operation; and the determining, according to the second instruction, whether the second operation matches a second preset operation includes:

determining whether the second instruction is generated when the user executes a preset hand gesture operation on the mobile terminal or sends a preset voice indication to the mobile terminal; and if the second instruction is generated when the user executes a preset hand gesture operation on the mobile terminal or sends a preset voice indication to the mobile terminal, determining that the second operation matches the second preset operation.

With reference to the third possible implementation manner of the first aspect, in a fourth possible implementation manner, the preset hand gesture operation includes any one of the following: lifting the mobile terminal and then keeping the mobile terminal motionless, shaking the mobile terminal and then keeping the mobile terminal motionless, tapping on a screen of the mobile terminal, double tapping on the screen of the mobile terminal, and sliding on the screen of the mobile terminal.

With reference to the first aspect or with reference to the first, the second, the third, or the fourth possible implementation manner of the first aspect, in a fifth possible implementation manner, the method further includes: if the second operation does not match the second preset operation, powering off the powered-on hardware used for photographing and releasing the preloaded camera application resource.

A second aspect of the embodiments of the present invention provides a mobile terminal, where the mobile terminal may include:

a first receiving unit, configured to receive a first instruction generated when a user executes a first operation on the mobile terminal;

a first determining unit, configured to determine, according to the first instruction, whether the first operation matches a first preset operation;

a loading unit, configured to, if the first operation matches the first preset operation, power on hardware used for photographing, and preload a camera application resource;

a second receiving unit, configured to receive a second instruction generated when a user executes a second operation on the mobile terminal;

a second determining unit, configured to determine, according to the second instruction, whether the second operation matches a second preset operation; and a photographing unit, configured to execute a photographing action if the second operation matches the second preset operation.

In a first possible implementation manner of the second aspect, the first determining unit is specifically configured to:

detect an acceleration at which the mobile terminal moves when the user executes the first operation;

determine whether the acceleration reaches a preset threshold; and if the acceleration reaches the preset threshold, determine that the first operation matches the first preset operation; and the second determining unit is specifically configured to:

determine whether the acceleration changes to zero after the user executes the first operation; and if the acceleration changes to zero, determine that the second operation matches the second preset operation.

In a second possible implementation manner of the second aspect, the first determining unit is specifically configured to:

determine whether the first instruction is generated when the user presses a preset button on the mobile terminal for a first time; and if the first instruction is generated when the user presses the preset button on the mobile terminal for the first time, determine that the first operation matches the first preset operation; and the second determining unit is specifically configured to:

determine whether the second instruction is generated when the user presses the preset button for a second time, and a time difference between receipt of the second instruction and receipt of the first instruction is within a preset time difference; and if the second instruction is generated when the user presses the preset button for the second time, and the time difference between the receipt of the second instruction and the receipt of the first instruction is within the preset time difference, determine that the second operation matches the second preset operation.

In a third possible implementation manner of the second aspect, the first determining unit is specifically configured to:

determine whether the first instruction is generated when the user presses and holds a preset button on the mobile terminal; and if the first instruction is generated when the user presses and holds the preset button on the mobile terminal, determine that the first operation matches the first preset operation; and the second determining unit is specifically configured to:

determine whether the second instruction is generated when the user executes a preset hand gesture operation on the mobile terminal or sends a preset voice indication to the mobile terminal; and if the second instruction is generated when the user executes a preset hand gesture operation on the mobile terminal or sends a preset voice indication to the mobile terminal, determine that the second operation matches the second preset operation.

With reference to the third possible implementation manner of the second aspect, in a fourth possible implementation manner, the preset hand gesture operation includes any one of the following: lifting the mobile terminal and then keeping the mobile terminal motionless, shaking the mobile terminal and then keeping the mobile terminal motionless, tapping on a screen of the mobile terminal, double tapping on the screen of the mobile terminal, and sliding on the screen of the mobile terminal.

With reference to the second aspect or with reference to the first, the second, the third, or the fourth possible implementation manner of the second aspect, in a fifth possible implementation manner, the mobile terminal further includes:

a releasing unit, configured to, if the second operation does not match the second preset operation, power off the powered-on hardware used for photographing and release the preloaded camera application resource.

A third aspect of the embodiments of the present invention provides a mobile terminal, where the mobile terminal may include:

an input apparatus, an output apparatus, a memory, and a processor, where the memory stores a group of program code, and the processor is configured to invoke the program code stored in the memory to execute the following operations:

receiving a first instruction generated when a user executes a first operation on the mobile terminal;

determining, according to the first instruction, whether the first operation matches a first preset operation;

if the first operation matches the first preset operation, powering on hardware used for photographing, and preloading a camera application resource;

receiving a second instruction generated when a user executes a second operation on the mobile terminal;

determining, according to the second instruction, whether the second operation matches a second preset operation; and if the second operation matches the second preset operation, executing a photographing action.

In a first possible implementation manner of the third aspect, the processor is specifically configured to execute the following operations:

detecting an acceleration at which the mobile terminal moves when the user executes the first operation;

determining whether the acceleration reaches a preset threshold;

if the acceleration reaches the preset threshold, determining that the first operation matches the first preset operation;

determining whether the acceleration changes to zero after the user executes the first operation; and if the acceleration changes to zero, determining that the second operation matches the second preset operation.

In a second possible implementation manner of the third aspect, the processor is specifically configured to execute the following operations:

determining whether the first instruction is generated when the user presses a preset button on the mobile terminal for a first time;

if the first instruction is generated when the user presses the preset button on the mobile terminal for the first time, determining that the first operation matches the first preset operation;

determining whether the second instruction is generated when the user presses the preset button for a second time, and a time difference between receipt of the second instruction and receipt of the first instruction is within a preset time difference; and if the second instruction is generated when the user presses the preset button for the second time, and the time difference between the receipt of the second instruction and the receipt of the first instruction is within the preset time difference, determining that the second operation matches the second preset operation.

In a third possible implementation manner of the third aspect, the processor is specifically configured to execute the following operations:

determining whether the first instruction is generated when the user presses and holds a preset button on the mobile terminal;

if the first instruction is generated when the user presses and holds the preset button on the mobile terminal, determining that the first operation matches the first preset operation;

determining whether the second instruction is generated when the user executes a preset hand gesture operation on the mobile terminal or sends a preset voice indication to the mobile terminal; and if the second instruction is generated when the user executes a preset hand gesture operation on the mobile terminal or sends a preset voice indication to the mobile terminal, determining that the second operation matches the second preset operation.

With reference to the third possible implementation manner of the third aspect, in a fourth possible implementation manner, the preset hand gesture operation includes any one of the following: lifting the mobile terminal and then keeping the mobile terminal motionless, shaking the mobile terminal and then keeping the mobile terminal motionless, tapping on a screen of the mobile terminal, double tapping on the screen of the mobile terminal, and sliding on the screen of the mobile terminal.

With reference to the third aspect or with reference to the first, the second, the third, or the fourth possible implementation manner, in a fifth possible implementation manner, the processor is further configured to execute the following operation:

if the second operation does not match the second preset operation, powering off the powered-on hardware used for photographing and releasing the preloaded camera application resource.

Implementing the embodiments of the present invention has the following beneficial effects:

A mobile terminal determines, according to a first instruction generated by a first operation of a user, whether the user has a photographing requirement; and further, when the user has the photographing requirement, triggers preparatory work of software and hardware resources related to a camera to get prepared for photographing; then determines, according to a second instruction generated by a second operation of a user, whether the user requires the mobile terminal to execute a photographing action; and when it is determined that the user requires the mobile terminal to execute the photographing action, the mobile terminal can execute the photographing action according to the preparatory work that is prepared for photographing, thereby implementing quick photo capturing and improving photo capturing efficiency, which helps a user to record beautiful scenery that the user wants to save.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
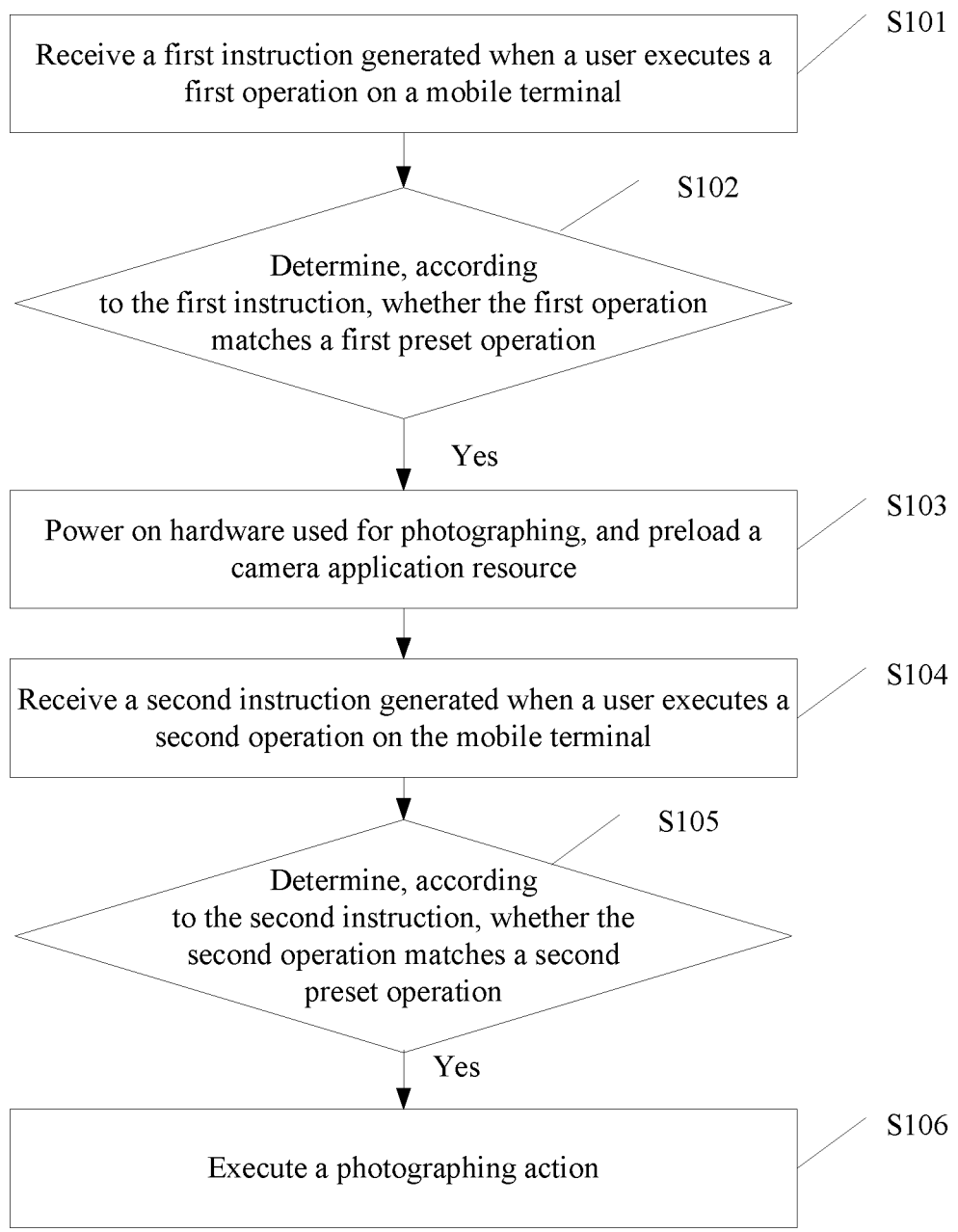
FIG. 1 is a schematic flowchart of a first embodiment of a photographing method according to the present invention.

Referring to FIG. 1, FIG. 1 is a schematic flowchart of a first embodiment of a photographing method according to the present invention. In this embodiment, the method includes the following steps:

S101: Receive a first instruction generated when a user executes a first operation on a mobile terminal.

When the user performs various operations on the mobile terminal, the mobile terminal receives different instructions. For example, operations such as pressing a physical button on the mobile terminal, touching a screen of the mobile terminal, and shaking the mobile terminal generate corresponding instructions, which are received by the mobile terminal. The mobile terminal can determine, according to these instructions, a type of an operation that is currently being executed by the user, so that a corresponding response or feedback is performed.

Optionally, the first operation herein may be quickly lifting, by the user, the mobile terminal, pressing a button on the mobile terminal, or pressing and holding a button on the mobile terminal, and the like. After receiving instructions generated by these operations, the mobile terminal can execute step S102, so as to predict whether the user has a photographing requirement.

S102: Determine, according to the first instruction, whether the first operation matches a first preset operation. If the first operation matches the first preset operation, execute step S103.

Specifically, the first instruction is generated by the first operation of the user, and has a correspondence with the first operation. Therefore, after receiving the first instruction, the mobile terminal can learn, according to the first instruction, an operation type of the first operation performed by the user, and then matches the first operation with the first preset operation, thereby learning about whether the user has a photographing requirement.

S103: Power on hardware used for photographing, and preload a camera application resource.

Specifically, when the first operation matches the first preset operation, it indicates that the user needs to take a photo. In this case, all preparatory work for photographing that is previous to triggering a photographing action can be done, where the preparatory work may include hardware preparatory work of the mobile terminal and preparatory work of software related to photographing. For example, the preparatory work may be powering on hardware, which is responsible for photographing, of the mobile terminal. For example, when the first operation matches the first preset operation, the mobile terminal may execute an operation of powering on a processor, a sensor, and an image signal processor (Image Signal Processor, ISP for short); and may power on and lighten the screen of the mobile terminal. Certainly, the screen may also not be powered on for the moment according to a consideration of power consumption, which is not limited in any form herein. The preparatory work of software related to photographing may include preloading a software resource related to a camera application. In this way, preparations may be made in advance for subsequent photographing, that is, the hardware is powered on in advance and the software resource is preloaded, so that photo capturing time required from the user takes out the mobile terminal to taking a photo is reduced.

It should be understood that, powering on the hardware used for photographing, and preloading the camera application resource herein should include all preparatory work that is previous to executing the photographing action. That is, when the terminal detects that the first operation matches the first preset operation, the mobile terminal may execute in advance, before the user finally triggers a photographing instruction, all actions that are previous to generating a captured picture.

S104: Receive a second instruction generated when a user executes a second operation on the mobile terminal.

After receiving the first instruction and determining that the first operation matches the first preset operation, and completing the preparatory work of the software and hardware related to photographing, if the mobile terminal receives the second instruction, the mobile terminal may determine, according to the second instruction, whether the second operation matches a second preset operation, and further determines whether the user requires the mobile terminal to immediately execute the photographing action.

S105: Determine, according to the second instruction, whether the second operation matches a second preset operation. If the second operation matches the second preset operation, execute step S106.

Optionally, the second operation executed by the user may be some photo capturing hand gestures executed by the user on the mobile terminal, or some quick operations on the physical button or the screen of the mobile terminal. All the operations may be performed when the mobile terminal is in a locked state; and it can be quickly determined whether the user really needs to take a photo without tapping on an icon of the camera application to start the camera. All the operations may also be performed when the mobile terminal is in an unlocked state, which is not limited in this embodiment of the present invention.

S106: Execute a photographing action.

After determining, according to the received second instruction, that the second operation matches the second preset operation, the mobile terminal takes a photo immediately and record instant scenery required to be captured.

It should be noted that, the user that executes the first operation and the user that executes the second operation may be a same user, and may also be different users, which is not limited in any form in the present invention. For example, the first operation is pressing and holding a physical button on the mobile terminal and then lifting the mobile terminal, which may be executed by a first user; and the second operation is a "photographing" voice indication that is used to control the mobile terminal to execute a photographing action, which may be executed by a second user.

In this embodiment, a mobile terminal determines, according to a first instruction generated by a first operation of a user, whether the user has a photographing requirement; and further, when the user has the photographing requirement, triggers preparatory work of software and hardware resources related to a camera to get prepared for photographing; then determines, according to a second instruction generated by a second operation of a user, whether the user requires the mobile terminal to execute a photographing action; and when it is determined that the user requires the mobile terminal to execute the photographing action, the mobile terminal can execute the photographing action according to the preparatory work that is prepared for photographing, thereby implementing quick photo capturing and improving photo capturing efficiency, which helps a user to record beautiful scenery that the user wants to save.

Figure 2:
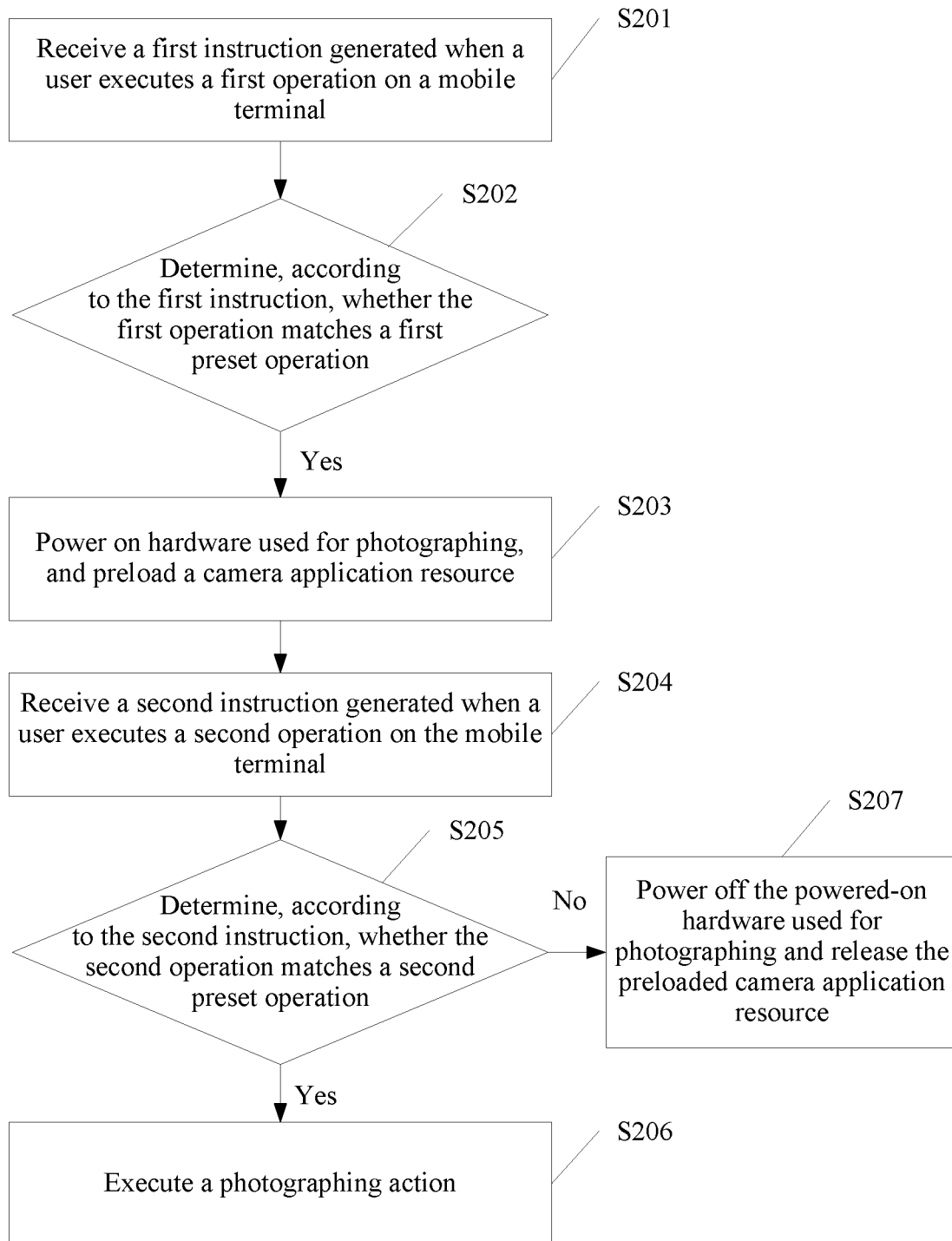
FIG. 2 is a schematic flowchart of a second embodiment of a photographing method according to the present invention.

Optionally, referring to FIG. 2, in a second embodiment of a photographing method according to the present invention, steps S201 to S206 of the method are the same as steps S101 to S106 in the first embodiment of the photographing method according to the present invention. In addition, in determining, according to the second instruction, whether the second operation matches the second preset operation, if the second operation does not match the second preset operation, it indicates that the user does not need to quickly execute the photographing action; and step S207 may be executed.

S207: Power off the powered-on hardware used for photographing and release the preloaded camera application resource.

In step S102 and step S202, prediction of a photographing requirement of the user is performed only according to the first instruction, and preparatory work of hardware and software required for photographing is performed in step S103 and S203; however, the user may not really have a photographing requirement. Therefore, when it is determined, according to a second instruction, that the second operation does not match the second preset operation, it may be determined that the user does not need to take a photo. In this case, the powered-on hardware used for photographing may be powered off, and the preloaded camera application resource may be released, so as to reduce unnecessary resource occupation and power consumption of the mobile terminal.

Figure 3:
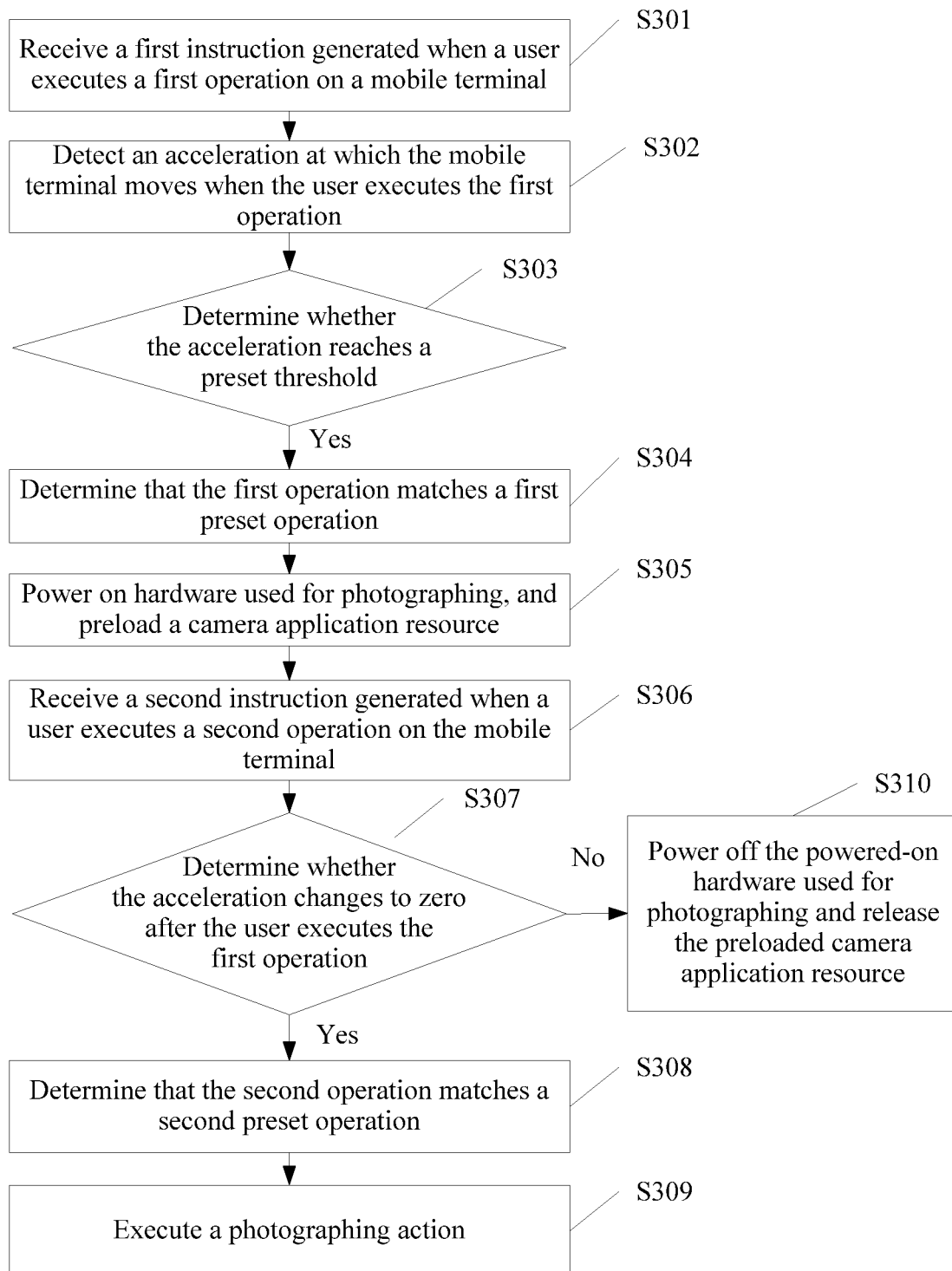
FIG. 3 is a schematic flowchart of a third embodiment of a photographing method according to the present invention.

Referring to FIG. 3, FIG. 3 is a schematic flowchart of a third embodiment of a photographing method according to the present invention. In this embodiment, the method includes the following steps:

S301: Receive a first instruction generated when a user executes a first operation on a mobile terminal.

Specifically, the user may quickly move the mobile terminal, or the user may shake the mobile terminal. The mobile terminal can acquire, by using a sensor, a first instruction generated when the user quickly moves or shakes the mobile terminal.

S302: Detect an acceleration at which the mobile terminal moves when the user executes the first operation.

Generally, the mobile terminal includes an acceleration sensor; and the acceleration of the mobile terminal can be detected by using the acceleration sensor. In this case, the first instruction is generated by moving, by the user, the mobile terminal at an acceleration, and can be acquired by the mobile terminal by detecting the acceleration. After the user acquires, by using the acceleration sensor, the first instruction input by the user, the terminal can detect the acceleration generated when the user quickly moves the terminal or shakes the mobile terminal.

S303: Determine whether the acceleration reaches a preset threshold. If the acceleration reaches the preset threshold, execute step S303. If the acceleration does not reach the preset threshold, it is unnecessary to power on hardware used for photographing, and preload a camera application resource.

When the user needs to quickly capture a photo, the user can quickly lift the mobile terminal. The acceleration at this moment is generally greater than an acceleration of the mobile terminal when it is normally used. Therefore, setting a preset threshold of the acceleration enables the mobile terminal to correctly identify a photographing requirement of the user, thereby avoiding powering on hardware used for photographing and avoiding preloading a camera application resource when relatively small acceleration is generated due to another operation performed by the user.

S304: Determine that the first operation matches the first preset operation.

Specifically, that the user has a photographing requirement can be determined according to a result of the determining whether the first operation matches the first preset operation, for example, when a moving acceleration of the mobile terminal is greater than or equal to the preset threshold.

S305: Power on hardware used for photographing, and preload a camera application resource.

S306: Receive a second instruction generated when a user executes a second operation on the mobile terminal.

S307: Determine whether the acceleration changes to zero after the user executes the second operation. If the acceleration changes to zero after the user executes the second operation, execute steps S308 to S309. If the acceleration does not change to zero after the user executes the second operation, execute step S310.

When the user quickly lifts the mobile terminal, the acceleration is relative large; and when the user needs to take a photo, in order to ensure a photographing effect, the mobile terminal keeps motionless, and at this moment the acceleration changes to zero. It should be noted that, when the user lifts the mobile terminal and keeps the mobile terminal motionless, there may be a certain degree of shaking due to a human factor. Therefore, step S308 may be executed when the acceleration changes to be approaching zero or the acceleration swings within a minimum range around zero.

Optionally, in an implementation manner of this embodiment of the present invention, the mobile terminal may also set a preset threshold. After the user executes the second operation, the terminal may also execute step S308 when determining that the acceleration of the mobile terminal is within the foregoing preset range. The acceleration preset threshold is a moving threshold of the mobile terminal when the mobile terminal can normally take a photo. The acceleration preset threshold can be set on a terminal before delivery, and may also selectively set by a user.

S308: Determine that the second operation matches the second preset operation.

When the second operation matches the second preset operation, it indicates that the user requires the mobile terminal to execute a photographing action.

S309: Execute a photographing action.

S310: Power off the powered-on hardware used for photographing and release the preloaded camera application resource.

In this embodiment, by analyzing a photo capturing action of a user, acceleration of a mobile terminal is used to reflect an operation of the user and is used for photographing requirement determining, hardware power-on, resource loading, and the like. In an entire process, the user can complete photographing without starting a camera application and without performing any operation on a screen of the mobile terminal, which features quick and convenient use.

Figure 4:
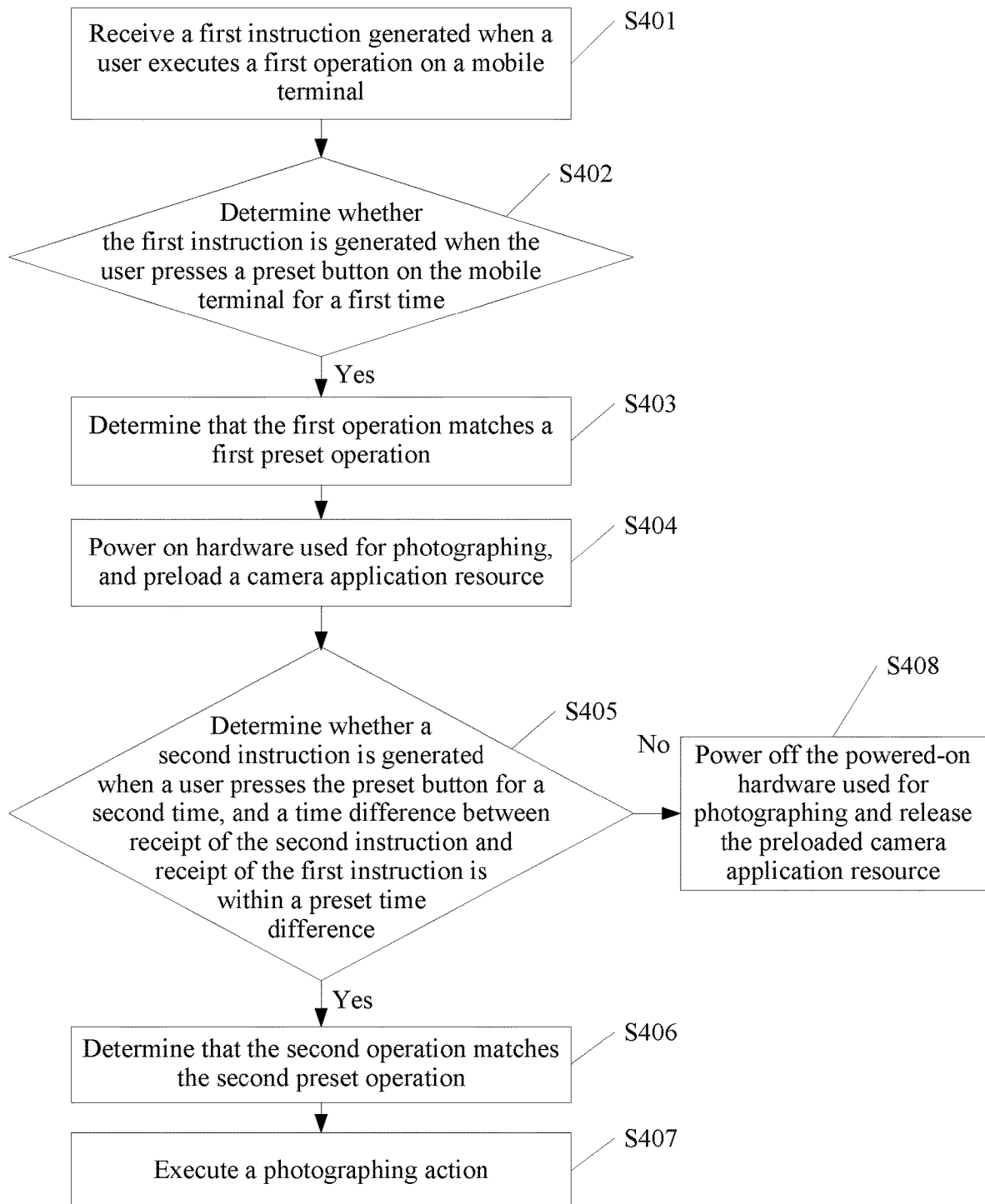
FIG. 4 is a schematic flowchart of a fourth embodiment of a photographing method according to the present invention.

Referring to FIG. 4, FIG. 4 is a schematic flowchart of a fourth embodiment of a photographing method according to the present invention. In this embodiment, the method includes the following steps:

S401: Receive a first instruction generated when a user executes a first operation on a mobile terminal.

S402: Determine whether the first instruction is generated when the user presses a preset button on the mobile terminal for a first time. If the first instruction is generated when the user presses the preset button on the mobile terminal for the first time, execute step S403.

Optionally, the preset button herein may be a physical button on the mobile terminal, for example, a volume up button or a volume down button on the mobile terminal, which is called a volume rocker in general in this embodiment. Certainly, the preset button may also be a power button. In this case, a screen is generally lightened, which relatively increases power consumption. In this embodiment, the volume rocker is used as an example in subsequent description.

S403: Determine that the first operation matches the first preset operation.

When the first operation matches the first preset operation, it indicates that the user has a photographing requirement.

S404: Power on hardware used for photographing, and preload a camera application resource.

S404: Determine whether the second instruction is generated when a user presses the preset button for a second time, and a time difference between receipt of the second instruction and receipt of the first instruction is within a preset time difference. If the second instruction is generated when the user presses the preset button for the second time, and the time difference between the receipt of the second instruction and the receipt of the first instruction is within the preset time difference, execute steps S406 to S407. If the second instruction is not generated when the user presses the preset button for the second time, and the time difference between the receipt of the first instruction and the receipt of the first instruction is not within the preset time difference, execute step S408.

Specifically, the terminal can acquire the second instruction generated when the user presses the preset button for the second time, and determine whether the time difference between acquisition of the second instruction and acquisition of the first instruction is within a preset range. For example, the preset time difference may be set to 300 milliseconds. In this way, when a time difference between consecutive operations of a user of pressing a volume rocker is within 300 milliseconds, it may be determined that the user needs to take a photo. Certainly, the preset time can be increased or reduced according to a usage habit of a user.

S406: Determine that the second operation matches the second preset operation.

When the first operation matches the first preset operation, it indicates that the user requires the mobile terminal to execute a photographing action.

S407: Execute a photographing action.

S408: Power off the powered-on hardware used for photographing and release the preloaded camera application resource.

In this embodiment, preparation and actual execution of photographing can be rapidly triggered by performing, within a preset time difference, two consecutive pressing operations on a preset button on a mobile terminal, which reduces time required for photo capturing.

Figure 5:
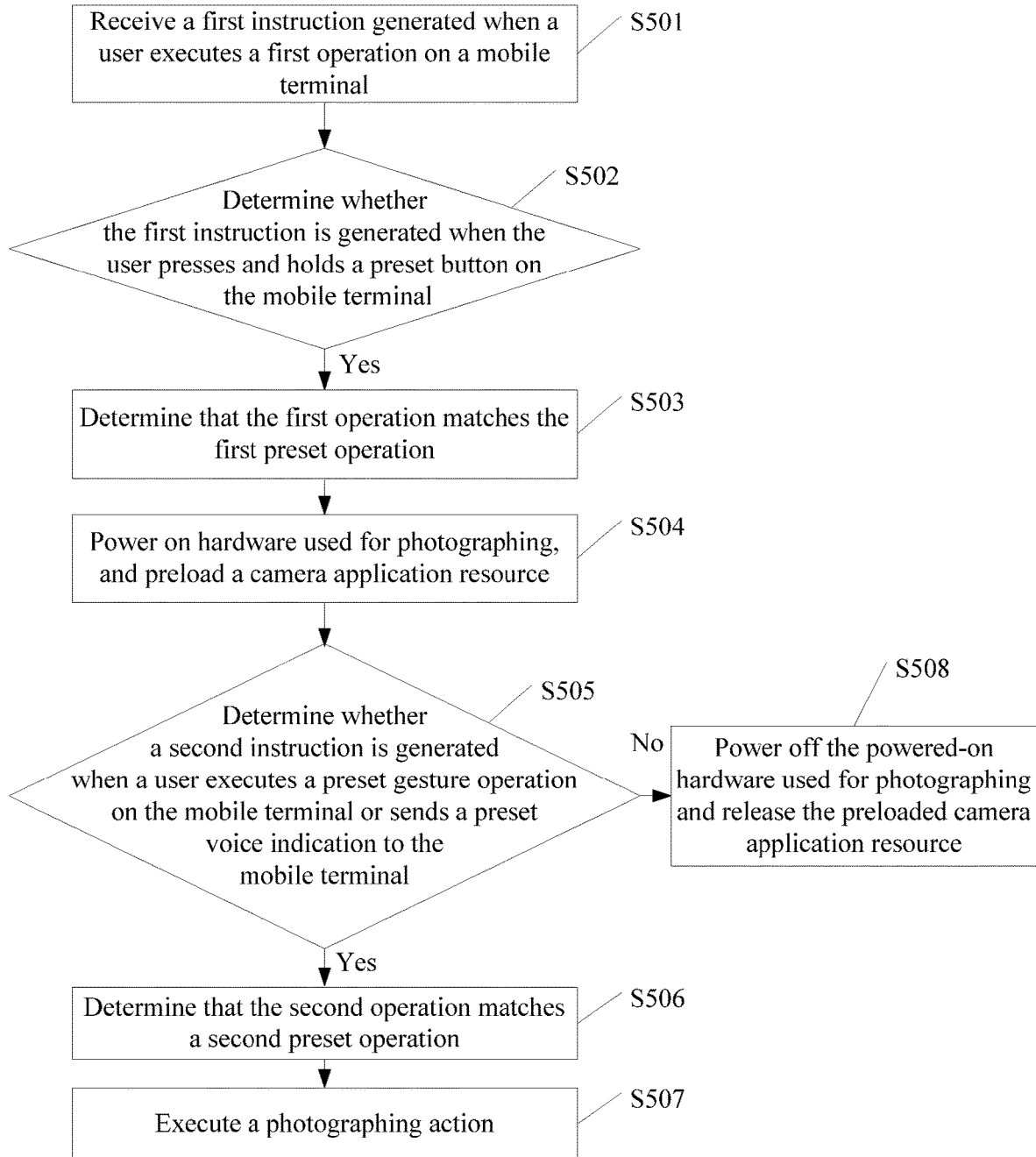
FIG. 5 is a schematic flowchart of a fifth embodiment of a photographing method according to the present invention.

Referring to FIG. 5, FIG. 5 is a schematic flowchart of a fifth embodiment of a photographing method according to the present invention. In this embodiment, the method includes the following steps:

S501: Receive a first instruction generated when a user executes a first operation on a mobile terminal.

S502: Determine whether the first instruction is generated when the user presses and holds a preset button on the mobile terminal. If the first instruction is generated when the user presses and holds the preset button on the mobile terminal, execute step S503.

Optionally, the preset button herein may be a physical button on the mobile terminal, for example, a volume up button or a volume down button, which is called a volume rocker in general in this embodiment. Certainly, the preset button may also be a power button. In this case, a screen is generally lightened, which relatively increases power consumption. In this embodiment, the volume rocker is used as an example in subsequent description.

S503: Determine that the first operation matches the first preset operation, which indicates that the user has a photographing requirement.

S504: Power on hardware used for photographing, and preload a camera application resource.

S504: Determine whether the second instruction is generated when a user executes a preset hand gesture operation on the mobile terminal or sends a preset voice indication to the mobile terminal. If the second instruction is generated when a user executes a preset gesture operation on the mobile terminal or sends a preset voice indication to the mobile terminal, execute steps S506 to S507. If the second instruction is not generated when a user executes a preset gesture operation on the mobile terminal or sends a preset voice indication to the mobile terminal, execute step S508.

Optionally, the preset hand gesture operation includes any one of the following: lifting the mobile terminal and then keeping the mobile terminal motionless, shaking the mobile terminal and then keeping the mobile terminal motionless, tapping on a screen of the mobile terminal, double tapping on the screen of the mobile terminal, and sliding on the screen of the mobile terminal.

Triggering a photographing action by lifting the mobile terminal and then keeping the mobile terminal motionless is implemented by detecting, by the mobile terminal, an acceleration at which the mobile terminal moves. In a process of lifting the mobile terminal, the acceleration of the mobile terminal is greater than zero; and the photographing action can be triggered when the acceleration becomes smaller, that is, when moving of the mobile terminal becomes slow until the acceleration changes to zero. For example, the first preset operation is that a user presses and holds a physical button; and the second preset button is lifting the mobile terminal and then keeping the mobile terminal motionless. Then, when a user presses and holds the volume rocker and lifts the mobile terminal, the mobile terminal can automatically execute a photographing action upon detecting that the mobile terminal is motionless. Similarly, triggering a photographing action by shaking the mobile terminal and then keeping the mobile terminal motionless is also implemented by detecting, by the mobile terminal, an acceleration at which the mobile terminal moves. When the mobile terminal is being shaken, the acceleration changes in an opposite direction, and when the mobile terminal is motionless and the acceleration approaches zero, the photographing action can be triggered.

S506: Determine that the second operation matches the second preset operation, which indicates that the user requires the mobile terminal to execute a photographing action.

S507: Execute a photographing action.

S508: Power off the powered-on hardware used for photographing and release the preloaded camera application resource.

In this embodiment, preparation for photographing and actual execution of a photographing action can be rapidly triggered by pressing and holding a preset button and executing a preset hand gesture operation or sending a preset voice prompt, which reduces time required for photo capturing.

Figure 6:
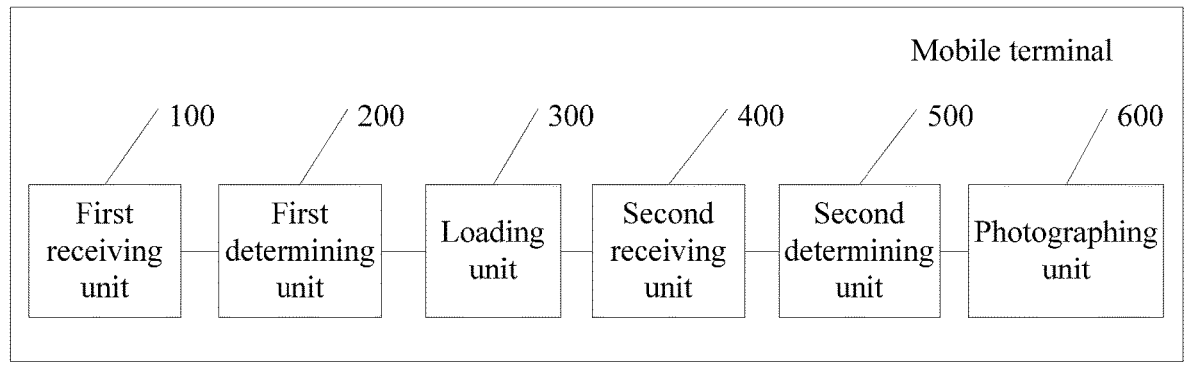
FIG. 6 is a schematic structural diagram of a first embodiment of a mobile terminal according to the present invention.

Referring to FIG. 6, FIG. 6 is a schematic structural diagram of a first embodiment of a mobile terminal according to the present invention. In this embodiment, the mobile terminal includes:

a first receiving unit 100, configured to receive a first instruction generated when a user executes a first operation on the mobile terminal;

a first determining unit 200, configured to determine, according to the first instruction, whether the first operation matches a first preset operation;

a loading unit 300, configured to, if the first operation matches the first preset operation, power on hardware used for photographing, and preload a camera application resource;

a second receiving unit 400, configured to receive a second instruction generated when a user executes a second operation on the mobile terminal;

a second determining unit 500, configured to determine, according to the second instruction, whether the second operation matches a second preset operation; and a photographing unit 600, configured to execute a photographing action if the second operation matches the second preset operation.

Figure 7:
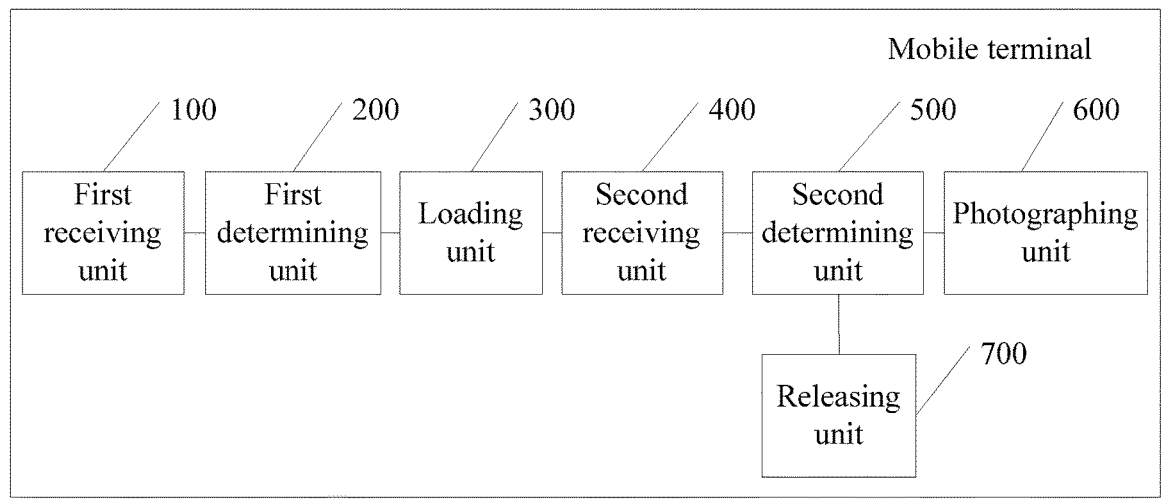
FIG. 7 is a schematic structural diagram of a second embodiment of a mobile terminal according to the present invention.

Optionally, referring to FIG. 7, in a second embodiment of a mobile terminal according to the present invention, the mobile terminal may further include a releasing unit 700, where the releasing unit 700 is configured to, if the second operation does not match the second preset operation, power off powered-on hardware used for photographing and release preloaded camera application resource.

A first receiving unit 100 and a second receiving unit 400 may be disposed in an integrated manner, and may also be disposed independently. Likewise, a first determining unit 200 and a second determining unit 500 may be disposed in an integrated manner, and may also be disposed independently.

Optionally, the first determining unit 100 is specifically configured to:

detect an acceleration at which the mobile terminal moves when a user executes the first operation;

determine whether the acceleration reaches a preset threshold; and if the acceleration reaches the preset threshold, determine that the first operation matches the first preset operation; and the second determining unit 400 is specifically configured to:

determine whether the acceleration changes to zero after the user executes the first operation; and if the acceleration changes to zero, determine that the second operation matches the second preset operation.

Alternatively, the first determining unit 100 is specifically configured to:

determine whether the first instruction is generated when the user presses a preset button on the mobile terminal for a first time; and if the first instruction is generated when the user presses the preset button on the mobile terminal for the first time, determine that the first operation matches the first preset operation; and the second determining unit 400 is specifically configured to:

determine whether the second instruction is generated when a user presses the preset button for a second time, and a time difference between receipt of the second instruction and receipt of the first instruction is within a preset time difference; and if the second instruction is generated when the user presses the preset button for the second time, and the time difference between the receipt of the second instruction and the receipt of the first instruction is within the preset time difference, determine that the second operation matches the second preset operation.

Alternatively, the first determining unit 100 is specifically configured to:

determine whether the first instruction is generated when the user presses and holds a preset button on the mobile terminal; and if the first instruction is generated when the user presses and holds the preset button on the mobile terminal, determine that the first operation matches the first preset operation; and the second determining unit 400 is specifically configured to:

determine whether the second instruction is generated when the user executes a preset hand gesture operation on the mobile terminal or sends a preset voice indication to the mobile terminal; and if the second instruction is generated when the user executes a preset hand gesture operation on the mobile terminal or sends a preset voice indication to the mobile terminal, determining that the second operation matches the second preset operation.

The preset hand gesture operation includes any one of the following: lifting the mobile terminal and then keeping the mobile terminal motionless, shaking the mobile terminal and then keeping the mobile terminal motionless, tapping on a screen of the mobile terminal, double tapping on the screen of the mobile terminal, and sliding on the screen of the mobile terminal.

It should be noted that, the foregoing first receiving unit 100, first determining unit 200, loading unit 300, second receiving unit 400, second determining unit 500, photographing unit 600, and releasing unit 700 may exist independently, and may also be disposed in an integrated manner. In addition, the first determining unit 200, the loading unit 300, the second determining unit 500, the photographing unit 600, and the releasing unit 700 in the foregoing mobile terminal embodiments may be separately disposed, in a form of hardware, independent of a processor of a mobile terminal, and the disposition form may be a form of a microprocessor; may also be embedded, in a form of hardware, in the processor of the mobile terminal; and may further be stored, in a form of software, in a memory of the mobile terminal, so as to help the processor of the mobile terminal to invoke and execute operations corresponding to the foregoing first determining unit 200, loading unit 300, second determining unit 500, photographing unit 600, and releasing unit 700.

For example, in the first embodiment (the embodiment shown in FIG. 6) of the mobile terminal according to the present invention, the first determining unit 200 may be a processor of the mobile terminal, and functions of the loading unit 300 and the second determining unit 400 may be embedded in the processor. The loading unit 300 and the second determining unit 400 may also be separately disposed independent of the processor; and may also be stored, in a form of software, in a memory, and functions of the loading unit 300 and the second determining unit 400 are invoked and implemented by the processor. Certainly, the first receiving unit 100 and the second receiving unit 400 may be disposed in an integrated manner, and may also be independently disposed, or may further be disposed, independently or in an integrated manner, as an interface circuit of the mobile terminal. The embodiments of the present invention set no limitation. The foregoing processor may be a central processing unit (CPU), a microprocessor, a single-chip microcomputer, or the like.

Figure 8:
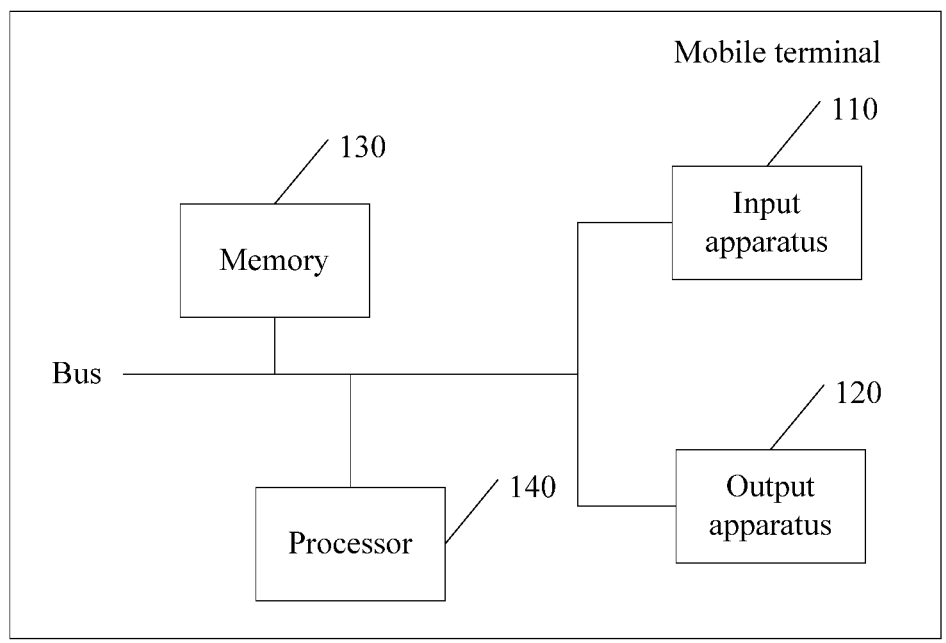
FIG. 8 is a schematic structural diagram of a third embodiment of a mobile terminal according to the present invention.

Referring to FIG. 8, FIG. 8 is a schematic structural diagram of a third embodiment of a mobile terminal according to the present invention. In this embodiment, the mobile terminal includes:

an input apparatus 110, an output apparatus 120, a memory 130, and a processor 140; where the memory 130 is configured to store a group of program code, and the processor 140 is configured to invoke the program code stored in the memory 130 to perform the following operations:

receiving a first instruction generated when a user executes a first operation on the mobile terminal;

determining, according to the first instruction, whether the first operation matches a first preset operation;

if the first operation matches the first preset operation, powering on hardware used for photographing, and preloading a camera application resource;

receiving a second instruction generated when a user executes a second operation on the mobile terminal;

determining, according to the second instruction, whether the second operation matches a second preset operation; and if the second operation matches the second preset operation, executing a photographing action.

The processor 140 is specifically configured to execute the following operations:

detecting an acceleration at which the mobile terminal moves when the user executes the first operation;

determining whether the acceleration reaches a preset threshold;

if the acceleration reaches the preset threshold, determining that the first operation matches the first preset operation;

determining whether the acceleration changes to zero after the user executes the first operation; and if the acceleration changes to zero, determine that the second operation matches the second preset operation.

Alternatively, the processor 140 is specifically configured to execute the following operations:

determining whether the first instruction is generated when the user presses a preset button on the mobile terminal for a first time;

if the first instruction is generated when the user presses the preset button on the mobile terminal for the first time, determining that the first operation matches the first preset operation;

determining whether the second instruction is generated when the user presses the preset button for a second time, and a time difference between receipt of the second instruction and receipt of the first instruction is within a preset time difference; and if the second instruction is generated when the user presses the preset button for the second time, and the time difference between the receipt of the second instruction and the receipt of the first instruction is within the preset time difference, determining that the second operation matches the second preset operation.

Alternatively, the processor 140 is specifically configured to execute the following operations:

determining whether the first instruction is generated when the user presses and holds a preset button on the mobile terminal;

if the first instruction is generated when the user presses and holds the preset button on the mobile terminal, determining that the first operation matches the first preset operation;

determining whether the second instruction is generated when the user executes a preset hand gesture operation on the mobile terminal or sends a preset voice indication to the mobile terminal; and if the second instruction is generated when the user executes a preset hand gesture operation on the mobile terminal or sends a preset voice indication to the mobile terminal, determining that the second operation matches the second preset operation.

The preset hand gesture operation includes any one of the following: lifting the mobile terminal and then keeping the mobile terminal motionless, shaking the mobile terminal and then keeping the mobile terminal motionless, tapping on a screen of the mobile terminal, double tapping on the screen of the mobile terminal, and sliding on the screen of the mobile terminal.

It should be noted that the embodiments in this specification are all described in a progressive manner, each embodiment focuses on a difference from other embodiments, and mutual reference may be made to same or similar parts in the embodiments. An apparatus embodiment is basically similar to a method embodiment, and therefore is described briefly; and for related parts, reference may be made to partial descriptions in the method embodiments.

According to descriptions of the foregoing embodiments, the present invention has the following advantages:

A mobile terminal determines, according to a first instruction generated by a first operation of a user, whether the user has a photographing requirement; and further, when the user has the photographing requirement, triggers preparatory work of software and hardware resources related to a camera to get prepared for photographing; then determines, according to a second instruction generated by a second operation of a user, whether the user requires the mobile terminal to execute a photographing action; and when it is determined that the user requires the mobile terminal to execute the photographing action, the mobile terminal can execute the photographing action according to the preparatory work that is prepared for photographing, thereby implementing quick photo capturing and improving photo capturing efficiency, which helps a user to record beautiful scenery that the user wants to save.

It should be understood that mutual reference may be made to same and corresponding technical features in the foregoing embodiments.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing describes in detail a photographing method and a mobile terminal according to the embodiments of the present invention. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for performing a photographing operation by a mobile terminal, comprising:

detecting a first signal from a component of the mobile terminal, wherein the first signal is generated in response to a first force applied on the component;

determining whether the first signal meets a first preset condition, wherein the first signal meets the first preset condition when the first force applied on the component exceeds a preset threshold;
supplying electrical power to a photographing unit of the mobile terminal when the first signal meets the first preset condition, and pre-allocating an application resource for the photographing operation;
detecting a second signal from the component, wherein the second signal is generated by the component in response to a second force applied on the component;
determining whether the second signal meets a second preset condition, wherein the second signal meets the second preset condition when a time difference between the generation of the first signal and the generation of the second signal is within a preset time difference; and
performing the photographing operation when the second signal meets the second preset conditions;
wherein the component is a volume up key or a volume down key that is used for controlling an input or output volume of an audio signal.

2. A method for performing a photographing operation by a mobile terminal, comprising:
detecting a first signal from a first component of the mobile terminal, wherein the first component is a key for receiving an input, and the first signal is generated by the key in response to a first force applied on the key;
determining whether the first signal meets a first preset condition, wherein the first signal meets the first preset condition when the first force applied on the key exceeds a preset threshold;
supplying electrical power to a photographing unit of the mobile terminal when the first signal meets the first preset condition, and pre-allocating an application resource for the photographing operation;
detecting a second signal from a second component of the mobile terminal, wherein the second component is a touch screen device, and the second signal is generated by the touch screen device in response to a touch operation;
determining whether the second signal meets a second preset condition, wherein the second signal meets the second preset condition when a pattern of the touch operation matches a preset touch pattern; and
performing the photographing operation when the second signal meets the second preset condition.

3. The method according to claim 2, wherein the preset touch pattern is one of the following:
tapping on the touch screen device,
double tapping on the touch screen device, and
sliding an object on the touch screen device.

4. The method according to claim 2, wherein before detecting the first signal from the first component, the touch screen device is in a sleeping state.

5. The method according to claim 1, further comprising:
cease supplying the electrical power to the photographing unit when the second signal does not meet the second preset condition, and releasing the pre-allocated application resource.

6. The method according to claim 1, wherein before performing the photographing operation, the mobile terminal is in a locked state.

7. A mobile terminal, comprising:
a photographing unit;
a power supply unit;
a component configured to generate signals in response to external influences; and
a processor;
wherein the processor is configured to:
receive a first signal from the component, wherein the first signal is generated in response to a first force applied on the component;
determine whether the first signal meets a first preset condition, wherein the first signal meets the first preset condition when the first force applied on the component exceeds a preset threshold; and
pre-allocate an application resource for a photographing operation when the first signal meets the first preset condition;
wherein the power supply unit is configured to supply electrical power to the photographing unit when the first signal meets the first preset condition;
wherein the processor is further configured to:
receive a second signal from the component, wherein the second signal is generated by the component in response to a second force applied on the component; and
determine whether the second signal meets a second preset condition, wherein the second signal meets the second preset condition when a time difference between the generation of the first signal and the generation of the second signal is within a preset time difference; and
wherein the photographing unit is configured to perform a photographing operation when the second signal meets the second preset condition;
wherein the component is a volume up key or a volume down key that is used for controlling an input or output of an audio signal.

8. A mobile terminal, comprising:
a photographing unit, a power supply unit, a processor, and
a first component and a second component, each configured to generate signals in response to external influences;
wherein the processor is configured to:
receive a first signal from the first component, wherein the first component is a key for receiving an input, and the first signal is generated by the key in response to a first force applied on the key;
determine whether the first signal meets a first preset condition, wherein the first signal meets the first preset condition when the first force applied on the key exceeds a preset threshold; and
pre-allocate an application resource for a photographing operation when the first signal meets the first preset condition;
wherein the power supply unit is configured to supply electrical power to the photographing unit when the first signal meets the first preset condition;
wherein the processor is further configured to:
receive a second signal from the second component, wherein the second component is a touch screen device, and the second signal is generated by the touch screen device in response to a touch operation;
determine whether the second signal meets a second preset condition, wherein the second signal meets the second preset condition when a pattern of the touch operation matches a preset touch pattern; and
wherein the photographing unit is configured to perform a photographing operation when the second signal meets the second preset condition.

9. The mobile terminal according to claim 8, wherein the preset touch pattern is one of the following:

tapping on the touch screen device,
double tapping on the touch screen device, and
sliding an object on the touch screen device.

10. The mobile terminal according to claim 8, wherein before receiving the first signal from the first component, the touch screen device is in a sleeping state.

11. The mobile terminal according to claim 7, wherein the power supply unit is further configured to:
cease supplying the electrical power to the photographing unit when the second signal does not meet the second preset condition, and the processor is further configured to:
release the pre-allocated application resource when the second signal does not meet the second preset condition.

12. The mobile terminal according to claim 7, wherein before the photographing unit performs the photographing operation, the mobile terminal is in a locked state.

13. The method according to claim 1, wherein before detecting the first signal from the component, a touch screen of the mobile terminal is in a sleeping state.

14. The method according to claim 2, further comprising:
cease supplying the electrical power to the photographing unit when the second signal does not meet the second preset condition, and releasing the pre-allocated application resource.

15. The method according to claim 2, wherein before performing the photographing operation, the mobile terminal is in a locked state.

16. The method according to claim 2, wherein before detecting the first signal from the first component, the mobile terminal is in a locked state.

17. The mobile terminal according to claim 7, wherein before the processor receives the first signal from the first component, a touch screen of the mobile terminal is in a sleeping state.

18. The mobile terminal according to claim 8,
wherein the power supply unit is further configured to cease supplying the electrical power to the photographing unit when the second signal does not meet the second preset condition, and
wherein the processor is further configured to release the pre-allocated application resource when the second signal does not meet the second preset condition.

19. The mobile terminal according to claim 8, wherein before the photographing unit performs the photographing operation, the mobile terminal is in a locked state.

20. The mobile terminal according to claim 8, wherein before the processor receives the first signal from the first component, the mobile terminal is in a locked state.

* * * * *